US012633073B2

(12) United States Patent
Carter et al.

(10) Patent No.: US 12,633,073 B2
(45) Date of Patent: May 19, 2026

(54) EFFICIENT AVATAR CREATION WITH MESH PENETRATION AVOIDANCE

(71) Applicant: Snap Inc., Santa Monica, CA (US)

(72) Inventors: Adam Carter, Venice, CA (US); Gilberto Medina, Santa Monica, CA (US); Leah Spontaneo, Scarborough (CA); Wenzhou Wang, New York, NY (US)

(73) Assignee: Snap Inc., Santa Monica, CA (US)

( * ) Notice: Subject to any disclaimer, the term of this patent is extended or adjusted under 35 U.S.C. 154(b) by 252 days.

(21) Appl. No.: 18/493,424

(22) Filed: Oct. 24, 2023

(65) Prior Publication Data

US 2025/0131669 A1     Apr. 24, 2025

(51) Int. Cl.
| | |
|---|---|
| *G06T 19/20* | (2011.01) |
| *G06T 13/40* | (2011.01) |
| *G06T 17/20* | (2006.01) |
| *G06V 40/10* | (2022.01) |

(52) U.S. Cl.
CPC .............. *G06T 19/20* (2013.01); *G06T 13/40* (2013.01); *G06T 17/20* (2013.01); *G06V 40/103* (2022.01)

(58) Field of Classification Search
CPC .......... G06T 19/20; G06T 17/20; G06T 13/40
See application file for complete search history.

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |
| 5,880,731 | A | 3/1999 | Liles et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

(Continued)

*Primary Examiner* — Matthew Salvucci
(74) *Attorney, Agent, or Firm* — Schwegman Lundberg & Woessner, P.A.

(57) ABSTRACT

Described is a system for efficient avatar creation with mesh penetration avoidance by receiving a first body characteristic for a first virtual avatar, accessing a first body mesh of the first virtual avatar that corresponds to the first body characteristic, receiving a first accessory characteristic for the first virtual avatar, accessing a first accessory mesh that corresponds to the first accessory characteristic, and identifying a first portion of the first body mesh that is determined to penetrate the first accessory mesh, the penetration being determined prior to receiving the first body characteristic. The system modifies the first portion of the first body mesh that is determined to penetrate the first accessory mesh to generate an updated body mesh, applies the first accessory mesh to the updated first body mesh to generate the first virtual avatar, and displays the first virtual avatar.

19 Claims, 12 Drawing Sheets

(56) References Cited

U.S. PATENT DOCUMENTS

| | | | |
|---|---|---|---|
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| RE43,993 | E | 2/2013 | Park |
| 8,384,719 | B2 | 2/2013 | Reville et al. |
| RE44,054 | E | 3/2013 | Kim |
| RE44,068 | E | 3/2013 | Park |
| RE44,106 | E | 3/2013 | Park |
| 8,396,708 | B2 | 3/2013 | Park et al. |
| RE44,121 | E | 4/2013 | Park |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,532,364 | B2 | 12/2016 | Fujito |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,656,797 | B1 | 5/2020 | Alvi et al. |
| 10,657,695 | B2 | 5/2020 | Chand et al. |
| 10,657,701 | B2 | 5/2020 | Osman et al. |
| 10,762,174 | B2 | 9/2020 | Denton et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-Hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0158222 | A1 | 7/2008 | Li et al. |
| 2009/0016617 | A1 | 1/2009 | Bregman-amitai et al. |
| 2009/0055484 | A1 | 2/2009 | Vuong et al. |
| 2009/0070688 | A1 | 3/2009 | Gyorfi et al. |

(56) References Cited

U.S. PATENT DOCUMENTS

| | | | |
|---|---|---|---|
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2015/0206349 A1 | 7/2015 | Rosenthal et al. | |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0188920 A1 | 6/2019 | Mcphee et al. | |
| 2019/0280997 A1 | 9/2019 | Baldwin et al. | |
| 2020/0226811 A1* | 7/2020 | Kim | A63F 13/55 |
| 2020/0306637 A1 | 10/2020 | Baldwin et al. | |
| 2020/0372127 A1 | 11/2020 | Denton et al. | |
| 2020/0402136 A1* | 12/2020 | Sullivan | G06Q 30/06 |
| 2020/0410575 A1 | 12/2020 | Grantham et al. | |
| 2021/0074047 A1 | 3/2021 | Sheth et al. | |
| 2021/0089179 A1 | 3/2021 | Grantham et al. | |
| 2021/0104087 A1 | 4/2021 | Smith et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1 | 7/2021 | Chand et al. | |
| 2021/0240315 A1 | 8/2021 | Alvi et al. | |
| 2021/0243482 A1 | 8/2021 | Baril et al. | |
| 2021/0243503 A1 | 8/2021 | Kotsopoulos et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |

FOREIGN PATENT DOCUMENTS

| | | | |
|---|---|---|---|
| EP | 2184092 A2 | 5/2010 | |
| JP | 2001230801 A | 8/2001 | |
| JP | 5497931 B2 | 3/2014 | |
| KR | 101445263 B1 | 9/2014 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194439 A1 | 12/2014 | |
| WO | WO-2016090605 A1 | 6/2016 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

(56)     References Cited

OTHER PUBLICATIONS

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

\* cited by examiner

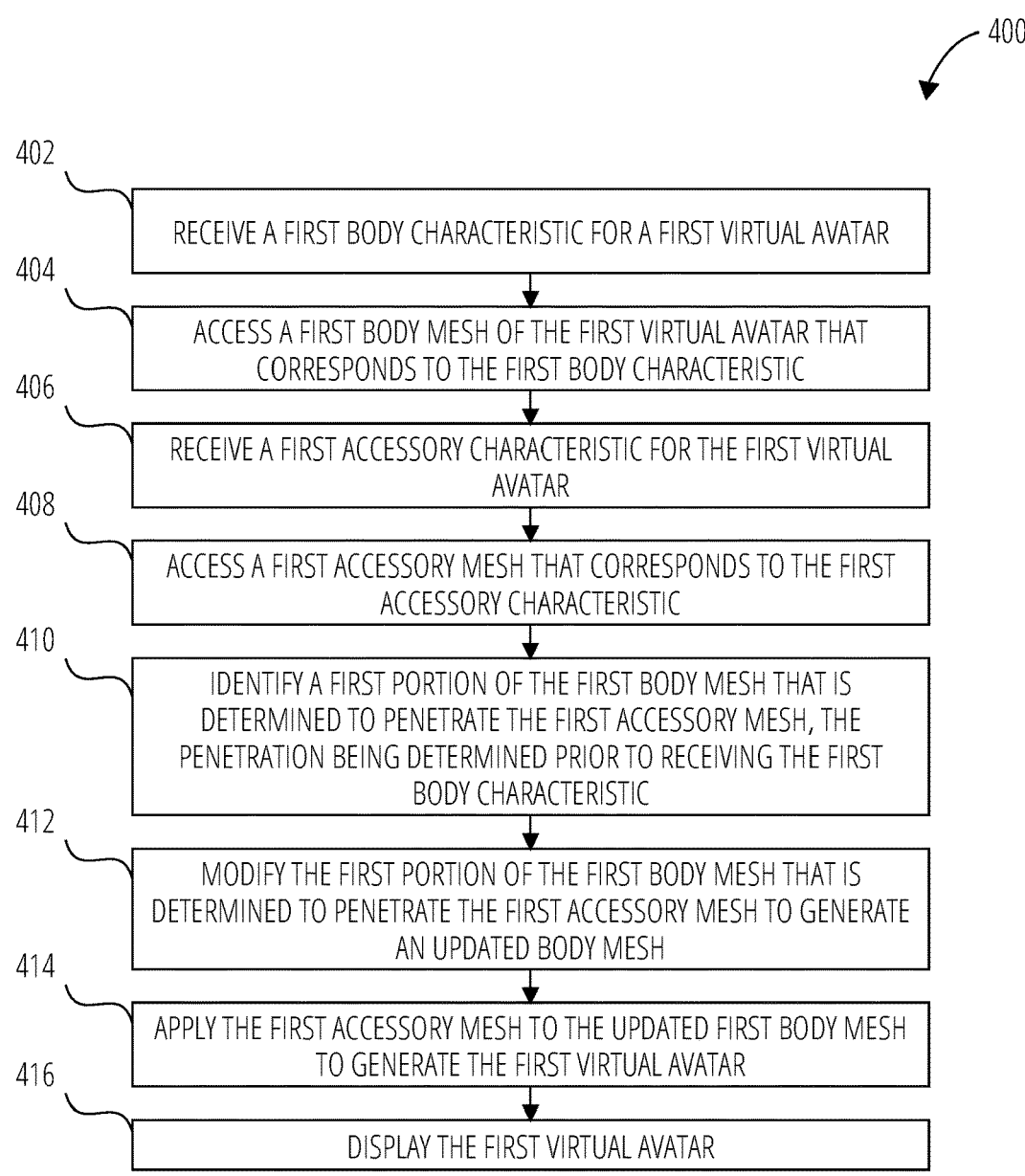

402 — RECEIVE A FIRST BODY CHARACTERISTIC FOR A FIRST VIRTUAL AVATAR

404 — ACCESS A FIRST BODY MESH OF THE FIRST VIRTUAL AVATAR THAT CORRESPONDS TO THE FIRST BODY CHARACTERISTIC

406 — RECEIVE A FIRST ACCESSORY CHARACTERISTIC FOR THE FIRST VIRTUAL AVATAR

408 — ACCESS A FIRST ACCESSORY MESH THAT CORRESPONDS TO THE FIRST ACCESSORY CHARACTERISTIC

410 — IDENTIFY A FIRST PORTION OF THE FIRST BODY MESH THAT IS DETERMINED TO PENETRATE THE FIRST ACCESSORY MESH, THE PENETRATION BEING DETERMINED PRIOR TO RECEIVING THE FIRST BODY CHARACTERISTIC

412 — MODIFY THE FIRST PORTION OF THE FIRST BODY MESH THAT IS DETERMINED TO PENETRATE THE FIRST ACCESSORY MESH TO GENERATE AN UPDATED BODY MESH

414 — APPLY THE FIRST ACCESSORY MESH TO THE UPDATED FIRST BODY MESH TO GENERATE THE FIRST VIRTUAL AVATAR

416 — DISPLAY THE FIRST VIRTUAL AVATAR

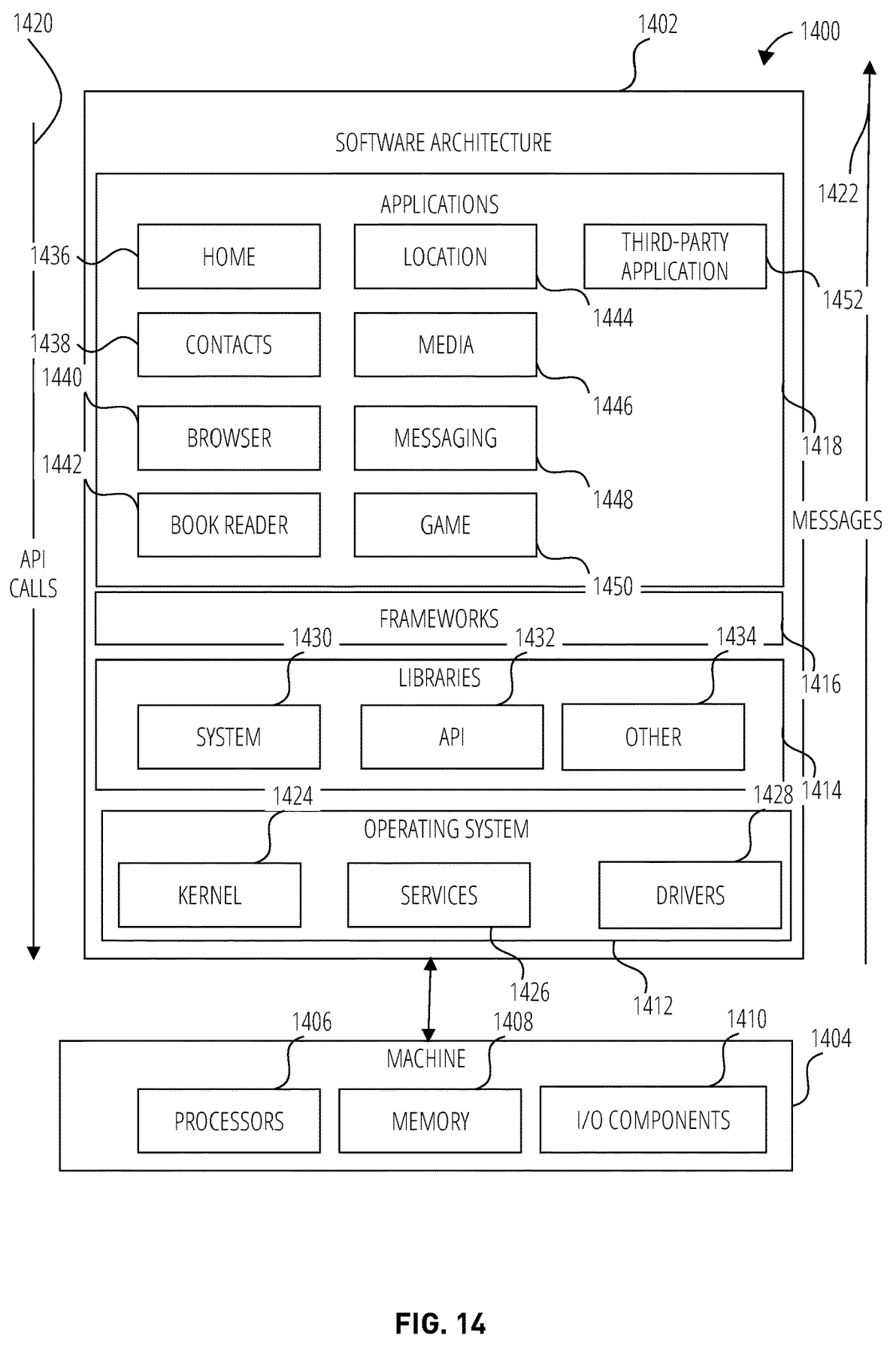

SOFTWARE ARCHITECTURE

1422

APPLICATIONS

1436    HOME    LOCATION    THIRD-PARTY APPLICATION

1452

1444

1438    CONTACTS    MEDIA

1440

1446

BROWSER    MESSAGING 1442    1418

1448

BOOK READER    GAME

MESSAGES

1450

FRAMEWORKS 1430    1432    1434

1416

LIBRARIES

SYSTEM    API    OTHER

API CALLS 1424    1428 1414

OPERATING SYSTEM

KERNEL    SERVICES    DRIVERS

1426

1406    1408    1412    1410    1404

MACHINE

PROCESSORS    MEMORY    I/O COMPONENTS

FIG. 14

EFFICIENT AVATAR CREATION WITH MESH PENETRATION AVOIDANCE

TECHNICAL FIELD

The present disclosure relates generally to generating avatars, and more specifically to avoiding mesh penetration during avatar creation.

BACKGROUND

Avatars have gained popularity in recent years due to several factors that cater to the evolving needs of users in the digital world. Avatars enable users to create a digital representation of themselves, offering a unique and customized presence in online spaces. This personal touch allows users to express their identity and personality in a way that text cannot. Also, by representing themselves through an avatar, users can protect their real-life identity while still engaging with others in a meaningful way. Moreover, immersive experiences, such as virtual reality (VR) and augmented reality (AR) technologies, has driven demand for avatars that can interact in these environments. Their increasing adoption in various applications and platforms reflects the growing demand for more engaging and immersive digital experiences.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 4 illustrates an example method for efficient avatar creation with mesh penetration avoidance, according to some examples.

FIG. 5 illustrates a user interface displaying options of accessory characteristics for the user to choose from, according to some examples.

FIG. 6 illustrates the retrieval of accessory meshes, according to some examples.

FIG. 14 is a block diagram showing a software architecture within which examples may be implemented.

DETAILED DESCRIPTION

Figure 1:
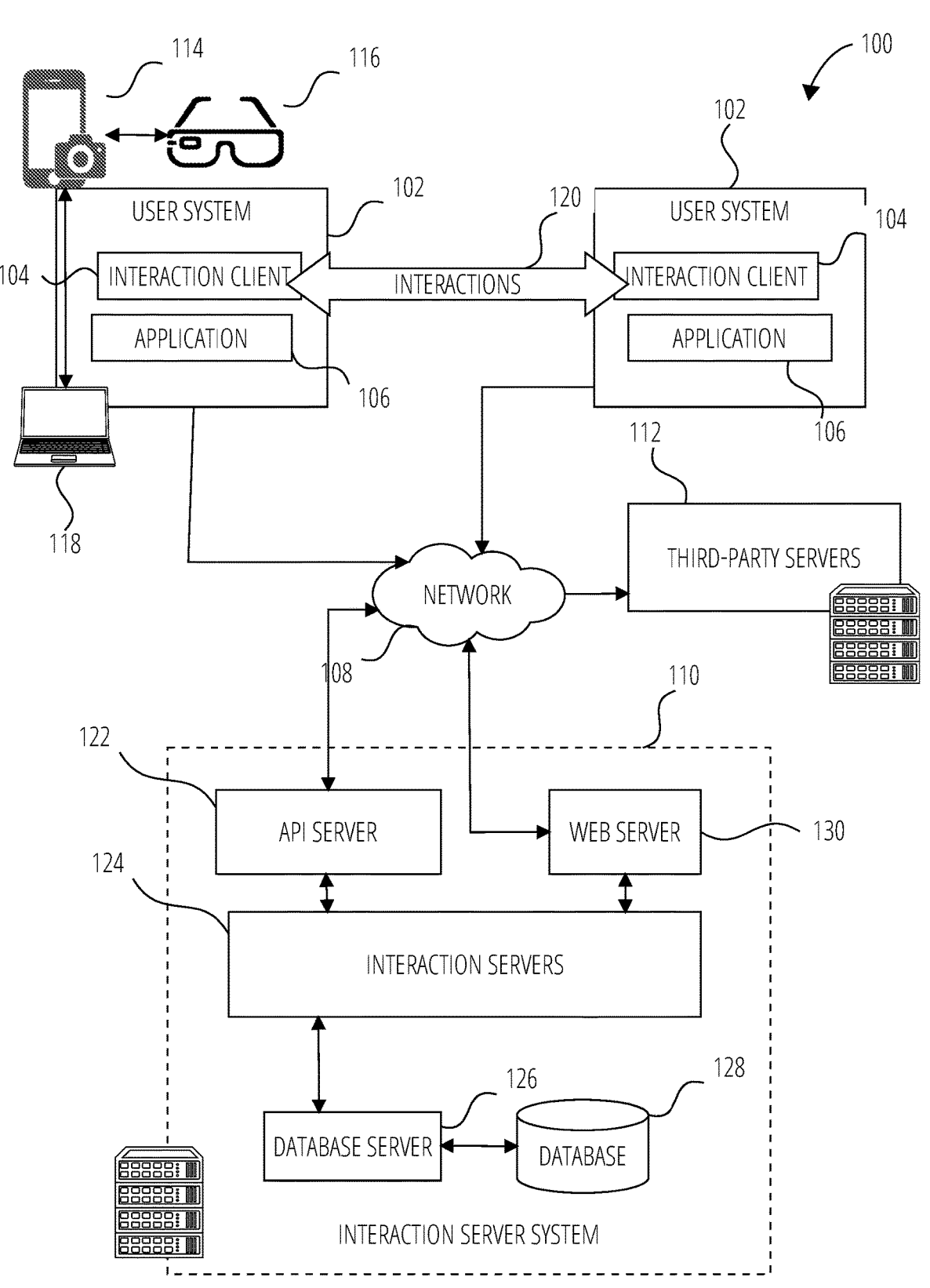
FIG. 1 is a diagrammatic representation of a networked environment in which the present disclosure may be deployed, according to some examples.

Traditional systems for generating avatars, especially on resource-constrained devices such as mobile phones, often rely on a combination of 3D modeling techniques and real-time computations. Traditional systems typically start with a basic 3D model or base mesh that represents a neutral human figure.

Users can customize various aspects of the avatar, including body shape, facial features, clothing, and accessories. These customizations involve deforming or morphing the base mesh to match the desired characteristics. Textures are then applied to the 3D mesh to add colors, details, and realistic skin tones.

When users make changes to the avatar, such as adjusting body size or selecting clothing, traditional systems require real-time computations to deform the 3D mesh accordingly. This can involve complex algorithms for mesh deformation.

Ensuring that clothing and accessories fit properly on the avatar's body is a challenging task. Real-time computations are often required to detect and prevent mesh intersections or "penetrations" where clothing or accessories cut into the avatar's body.

Real-time computations for mesh deformation and collision detection can be computationally intensive, leading to potential performance issues, especially on mobile devices with limited processing power and memory. Such leverage of identifying meshes and penetration data of the application of multiple meshes significantly improves the speed at which the avatars are generated.

Relevant meshes that correspond to the desired avatar characteristics are identified, and penetration portions are also identified. The system can then remove and/or modify certain meshes to avoid such penetration without having to generate and apply the meshes on the fly in response to a user request of an avatar.

Moreover, traditional systems may need to transfer and store large 3D model data, including the base avatar mesh, clothing models, and accessory models. This can result in substantial data transfer and storage requirements. The time required to download and process 3D model data, especially in real-time, can lead to latency issues, affecting user experience.

Some customizations, such as fine-grained facial features or intricate clothing designs, may be limited due to the complexity of real-time mesh deformation and rendering. Furthermore, traditional systems may struggle to provide a wide range of diverse customization options, leading to avatars that may look similar or lack individuality.

Overall, traditional avatar generation systems face technological pitfalls related to real-time computations, data size, and customization limitations, especially on mobile devices. These challenges can impact the user experience and limit the range of customization options available.

The avatar system described herein aims to address some of these pitfalls by precomputing body meshes and penetration information, offering a more efficient and responsive approach to avatar generation.

The avatar system precomputes body meshes and penetration information on the server side, reducing the need for real-time client-side computations during avatar generation. This significantly improves performance by minimizing the computational load on resource-constrained mobile devices.

Moreover, the avatar system minimizes data transfer requirements by sending the compact tree structure representation of avatars and/or identifiers corresponding to avatar characteristics, which reduce data size, latency, and storage demands, making avatar customization faster and more responsive.

The avatar system offers a wide range of customization options by efficiently swapping precomputed body meshes and associated tree structures or sub-structures. Users can easily modify avatars with fine-grained details, including facial features, hairstyles, clothing, and accessories, without encountering the limitations of real-time computation.

The avatar system fosters individuality and diversity by enabling users to create highly customizable avatars with unique combinations of body types, clothing, accessories, and more.

The avatar system's efficient precomputation and on-the-fly geometry generation make avatar customization highly responsive, even on resource-constrained devices. Users can enjoy a smooth and interactive experience when creating and modifying avatars.

The avatar system greatly improves runtime rendering performance for all devices. The avatar system optimizes avatar preview performance by reducing request latency and data transfer size. Reducing latency, having a small data transfer size, and leveraging cache storage (as further described herein) helps to reduce server requirements. Moreover, partial avatar model generation or retrieval on the server side helps to reduce computation requirements on the client side.

In summary, the avatar system significantly improves avatar generation by addressing the technological pitfalls of real-time computations, data size, customization limitations, individuality, and efficiency on mobile devices. By precomputing critical avatar data and optimizing data transfer and storage, we offer a streamlined and responsive avatar customization process, empowering users to create unique and personalized avatars with ease.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an avatar creation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
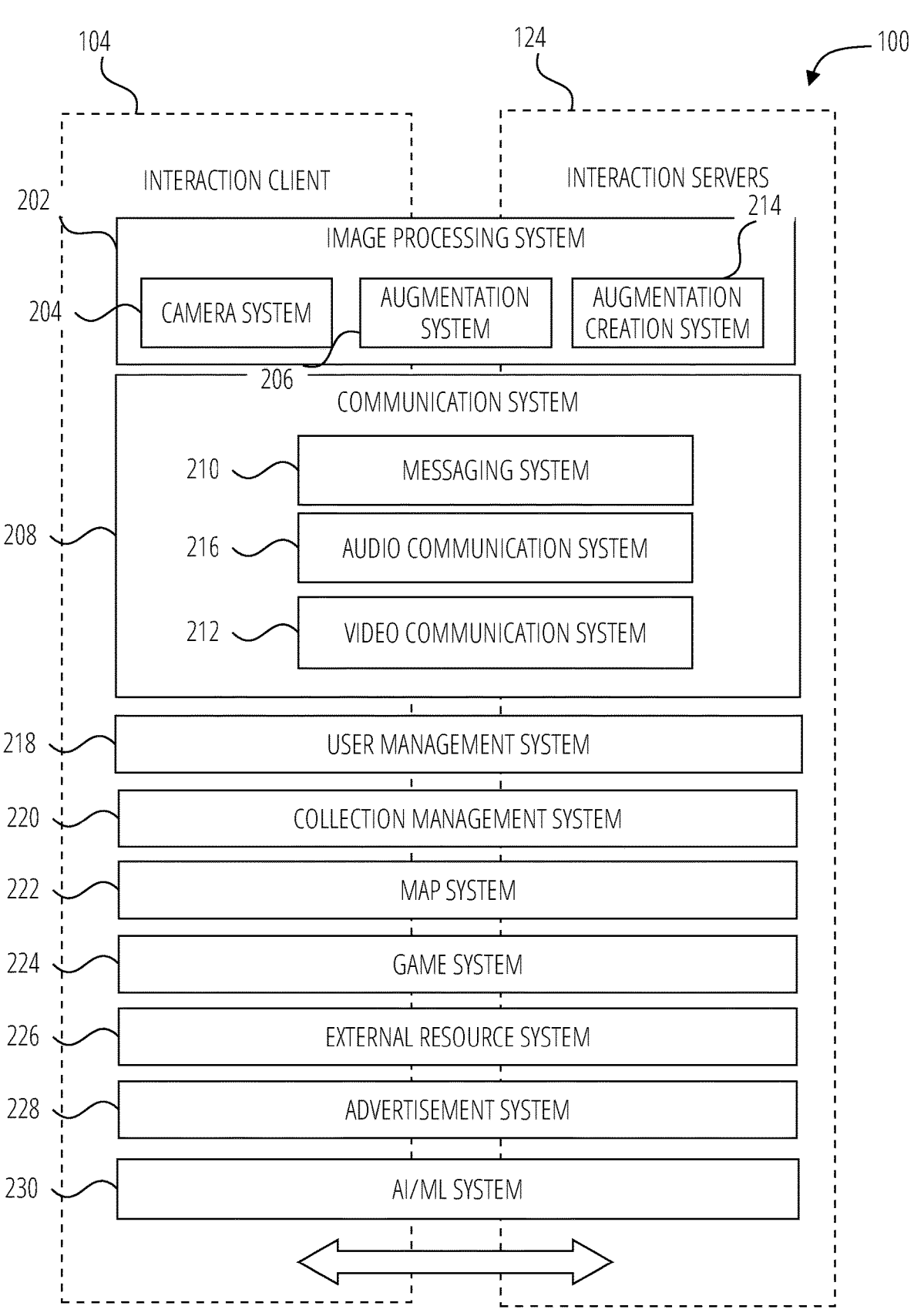
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The inter-action client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

Data Architecture

Figure 3:
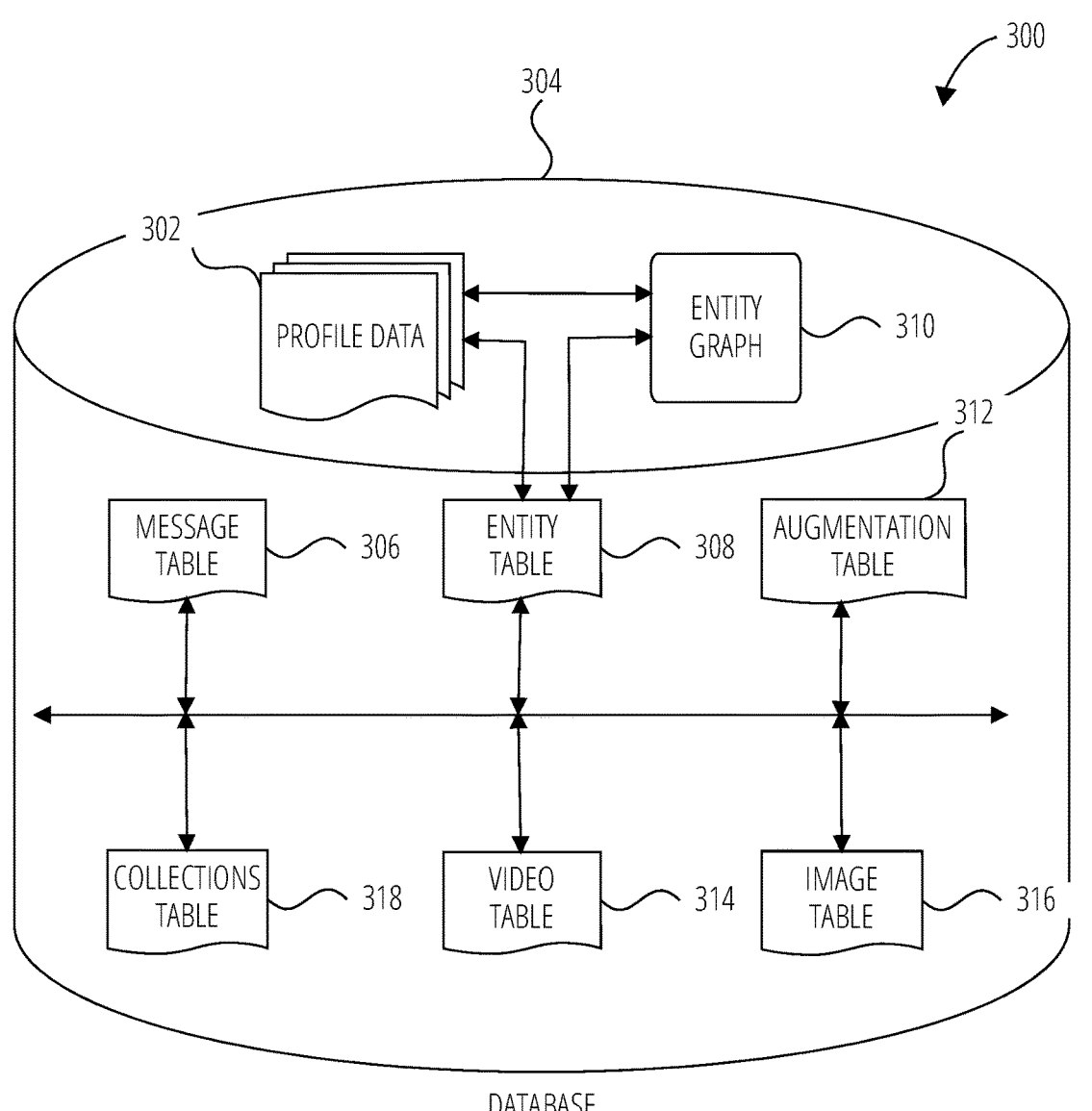
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database). In some cases, the database 304 includes features of or corresponds to database 128 in FIG. 1, and/or vice versa.

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

Efficient Avatar Creation with Mesh Penetration Avoidance

FIG. 4 illustrates an example method 400 for efficient avatar creation with mesh penetration avoidance, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At block 402, the avatar system receives a first body characteristic for a first virtual avatar. The avatar system allows users to customize their virtual avatar by selecting one or more physiological characteristics for the avatar. In some cases, the user can choose from a library of complete avatar models that have predefined body types, facial features, hair, clothes, etc. In some cases, the complete avatar models are selected, and the user can make modifications thereafter.

In some cases, the user can select specific traits such as a nose shape, eye color, hair style, and/or the like from a selection of options. For example, there may be 3 different nose shape options to choose from. In some cases, the user can select an avatar gender, which can impact body shape, facial features, and clothing options. In some cases, the user can select a body shape, such as adjusting the avatar's height, weight, and overall body proportions.

In some cases, the user can select a skin tone, selecting the avatar's skin color from a range of options. In some cases, the user can select facial features, such as customizing details like the avatar's eyes, nose, mouth, and jawline. In some cases, the user can select a hairstyle, choosing from various haircuts, lengths, and hair colors. In some cases, the user can select facial hair, such as selecting the style and color of facial hair for male avatars.

In some cases, the user can select eye color such as picking the color of the avatar's eyes. In some cases, the user can select makeup by applying makeup to enhance the avatar's facial features, which can include lipstick, eyeshadow, and blush.

In some cases, the user can select tattoos and scars by adding virtual tattoos, scars, or other markings to the avatar's skin. In some cases, the user can select body art by customizing body piercings, body paint, or other forms of body art.

In some cases, the user can select age by adjusting the apparent age of the avatar, from youthful to elderly. In some cases, the user can select a physique by fine-tuning muscle definition, body size, and body composition. In some cases, the user can select a height and proportions that alter specific body proportions such as leg length, torso length, and arm length.

In some cases, the user can select a posture and stance, such as selecting a default posture or stance for the avatar. In some cases, the user can select body artifacts that include options like scars, birthmarks, or freckles to add realism.

In some cases, the avatar system enables a user to scan their own face or body. The avatar system uses facial recognition technology to create avatars that closely resemble their real-life appearance. In some cases, the user submits an image video of themselves (or others if they want an avatar resembling another person). For example, the user can upload a selfie photo or video. The avatar system uses image processing and computer vision techniques to analyze the image and automatically determine the user's body type, facial features, skin tone, etc. This allows the system to generate an avatar that closely matches the user's real appearance based on their photo.

At block 404, the avatar system accesses a first body mesh of the first virtual avatar that corresponds to the first body characteristic. During the scanning process, the camera captures a significant amount of visual data from the user's face. This includes details like facial landmarks (eyes, nose, mouth), skin texture, complexion, and sometimes even 3D depth information.

Once the data is captured, the avatar system applies facial recognition algorithms to extract key facial features and characteristics. These algorithms identify and map landmarks on the user's face, creating a digital representation of their facial structure. The avatar system extracts measurements for distances between landmarks, ratios, contours, shapes to characterize the unique facial geometry.

In some cases, the avatar system identifies key body joints and takes length/width measurements of limbs, torso, etc. for body scans. In some cases, the avatar system applies a machine learning algorithm that is trained to compare these measurements against averaged data to determine the user's body shape and proportions.

The extracted facial features are then compared to a database of predefined avatar templates or models. These templates are designed to cover a range of facial shapes, expressions, and appearances.

The avatar system finds a template that most closely matches the user's scanned facial features. In some cases, the avatar system morphs or blends the template with the user's data to create an avatar that incorporates their real-life appearance.

The avatar system provides users with the option to fine-tune the generated avatar. Users can adjust details like hair color, hairstyle, clothing, accessories, and makeup to achieve a more personalized look. Users can preview the generated avatar to see how closely the avatar resembles their real self. They may have the option to make further adjustments or confirm the final avatar appearance.

At block 406, the avatar system receives a first accessory characteristic for the first virtual avatar. In some cases, the user can select special features such as customizing unique or fantasy elements like horns, tails, or unusual body shapes for non-human avatars. In some cases, the user can select a species or race, choosing the species or race of the avatar if it's a fantasy or sci-fi character. In some cases, the user can select an animation style by selecting an animation style that affects the avatar's movements and expressions. In some cases, the user can select clothing preferences, such as specifying clothing styles, colors, and accessories that the avatar wears.

In some cases, the user selects clothing from various styles of clothing, including shirts, pants, dresses, skirts, and more. In some cases, the user selects accessories such as hats, sunglasses, scarves, gloves, and belts. In some cases, the user selects a hairstyle, such as length, texture, and color.

In some cases, the user selects makeup for the avatar, including lipstick, eyeshadow, eyeliner, and blush. In some cases, the user selects jewelry such as necklaces, earrings, bracelets, and rings. In some cases, the user selects footwear such as shoes, boots, sandals, and sneakers. In some cases, the user selects special features, such as horns, tails, wings, or robotic limbs.

In some cases, the user selects emotes and gestures to apply to the avatar, such as on clothing or as a banner. In some cases, the user selects a voice and speech that adjusts the avatar's voice pitch, tone, and speech patterns. In some cases, the user selects a background and/or origin. In some cases, the user selects animations that customize how the avatar moves and interacts with the environment and other avatars.

In some cases, the user selects emotional expressions that include different facial expressions and emotional states for the avatar, including happiness, anger, sadness, and surprise. In some cases, the user selects body language that adjusts the avatar's body language and posture to convey different emotions and attitudes.

In some cases, the user selects an environment and/or setting, such as landscapes, cities, or themed locations. In some cases, the user selects companions, such as virtual pets, sidekicks, or companions that can accompany the avatar.

Figures 5, 6:
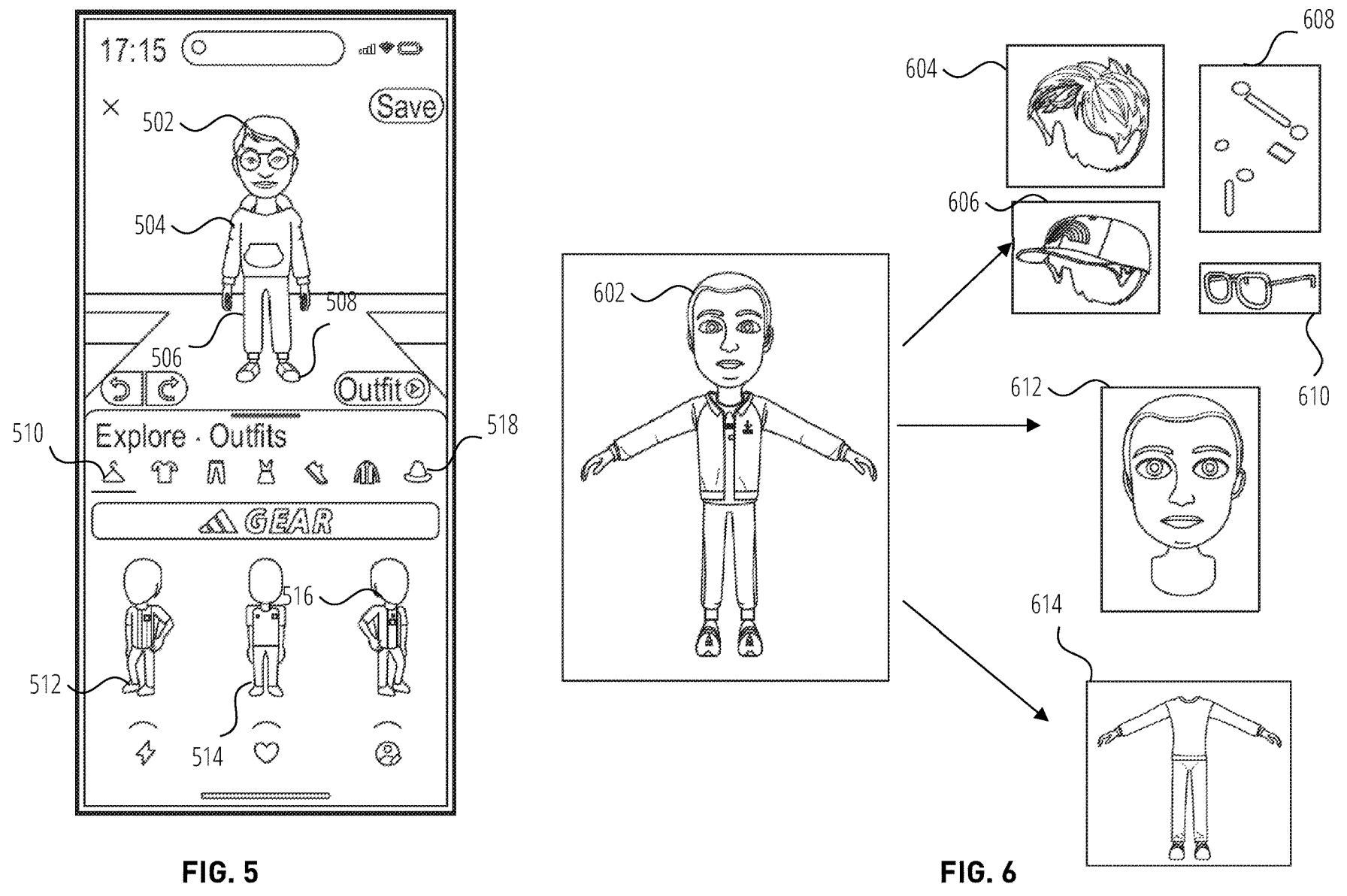

FIG. 5 illustrates a user interface displaying options of accessory characteristics for the user to choose from, according to some examples. After the user has selected body characteristics, the avatar system generates an avatar, such as avatar 502. In some cases, a default accessory, such as hoodie 504, pants 506, and shoes 508 are preselected.

In some cases, the avatar system provides the user with an option to select from one or more different outfits. For example, the user can select an option to change all accessories at once via the whole output tab 510. The user can then select from one of many different complete accessories, such as output 512, 514, and 516.

In some cases, the avatar system enables a user to change one accessory at a time, such as via the hat tab 518 that provides the user options to change hairstyle, hats, or other accessories that are placed on top of the head.

At block 408, the avatar system accesses a first accessory mesh that corresponds to the first accessory characteristic. In some cases, the avatar system has a library of predefined meshes or 3D models for various characteristics for accessories. When a user selects the "hat" characteristic, the system retrieves the corresponding mesh from its library.

In some cases, the avatar system uses templates that are modified based on user choices. For example, the avatar system may have a basic hat shape, and users can adjust parameters like color, size, and decorations to customize the hat.

The avatar system employs a layering system where each characteristic (e.g., hat, hair, glasses) is represented by a separate layer. When a user selects a hat, the system activates the hat layer and retrieves the appropriate mesh to the avatar.

For complex characteristics such as armor, the avatar system can retrieve and assemble multiple mesh components together to create the final appearance of the armor mesh. In some cases, users can select individual components and customize them to generate a unique combination.

FIG. 6 illustrates the retrieval of accessory meshes, according to some examples. The user is displayed an avatar 602. The user then selects a hair style 604, a hat 606, glasses 610, other accessories 608, and an outfit 614, and can modify the avatar, such as a head portion 612. In some cases, the avatar system retrieves the selected meshes from a library and generates an updated avatar. In some cases, the avatar system retrieves individual meshes as they are selected, and the avatar is updated. For example, a user can first select the hair style 604 and the avatar 602 is updated to show an avatar with the hair style 604. Subsequently, the user can select the hat 606, and the avatar is updated to show the avatar with the hair style 604 with the hat 606 worn on top of the hair style 604.

At block 410, the avatar system identifies a first portion of the first body mesh that is determined to penetrate the first accessory mesh, the penetration being determined prior to receiving the first body characteristic. The avatar system pre-generates 3D meshes for various avatar body types and accessories like clothes, hats, glasses etc.

When generating these meshes, the avatar system also computes any intersections between the body and accessory meshes. For example, the avatar system identifies parts of the body mesh that penetrate or collide with the hat mesh.

Figure 7:
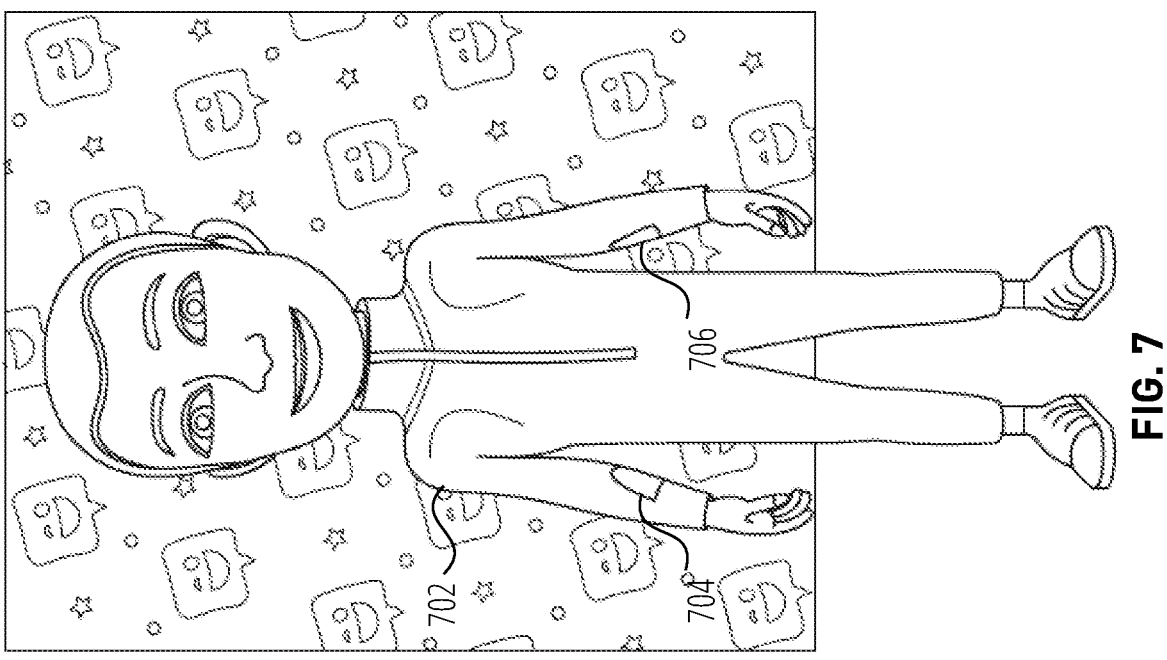
FIG. 7 illustrates the identification of an avatar where the body mesh penetrates the accessory mesh, according to some examples.

FIG. 7 illustrates the identification of an avatar 702 where the body mesh penetrates the accessory mesh, according to some examples. As shown in this example, the body mesh penetrates the accessory mesh in two portions, a first portion 704 and a second portion 706.

This body-accessory intersection data is stored in a database and associated with the corresponding body and accessory mesh pairs. Later when a user creates an avatar with a specific body type and equips an accessory, the system retrieves the matching body and accessory meshes from the database. Importantly, the identification of the penetrating portion of the body mesh is done without applying the body mesh to the accessory mesh after receiving the user's selection.

Since the penetration data has already been precomputed, the system knows exactly which parts of the body mesh intersect with that accessory mesh and does not have to dynamically re-calculate the mesh collisions again. The penetrating portion of the body mesh is identified without having to apply the body mesh to the accessory mesh on the fly after receiving the user's selection. This approach is efficient because it doesn't require the system to compute mesh penetration in real-time, which can be computationally expensive.

The body mesh, the accessory mesh, and the portion of the body mesh that is determined to penetrate the accessory mesh is retrieved from a database. In some cases, the avatar system retrieves such meshes and portions in response to determining that the system has precomputed the meshes and penetrating portions beforehand. For example, the system checks whether there is a database entry of the body mesh that corresponds to the body characteristic and a second database entry of the accessory mesh that is associated with the body mesh in a library or database.

The avatar system not only checks for the body mesh and the accessory mesh, but also for whether the accessory mesh corresponds to the body mesh in the database, such as linked together to indicate that the penetration portions have been determined between the body and accessory meshes. This greatly saves computation time and reduces the amount of required computational power. As such, avatars can be generated and modified very quickly and on devices that may have limited computational power.

In some cases, the avatar system does not identify the body mesh being associated with the accessory mesh. In such cases, the avatar system determines if a body mesh and/or an accessory mesh is available. If available, the avatar system retrieves such meshes. For the meshes that are not available, the avatar system generates such meshes.

Then the avatar system applies the meshes to identify portions of them that penetrate the other meshes. The body mesh, accessory mesh, and portions that penetrate meshes are saved into the library or database such that if at a later time another user requests a similar body mesh and accessory mesh, the avatar system can retrieve the meshes and portions, obviating the need to regenerate the meshes and identify penetration portions.

In some cases, the avatar system creates meshes of a virtual avatar from a user's desired characteristics. The avatar system creates a base 3D mesh that represents the avatar's body, such as a neutral, featureless figure. The neutral figure can be a generic human-like shape that serves as the foundation for customization.

The user's selected body characteristics, such as body type, height, and proportions, are applied to the base mesh. This is achieved through deformation or morphing of the base mesh. For example, sliders or parameters can adjust the body's dimensions to match the user's preferences.

Similar to body customization, facial features are adjusted. The user's chosen facial characteristics, including eyes, nose, mouth, and jawline, are applied to the base mesh. This might involve morphing the base mesh or switching to a different predefined facial mesh.

At block 412, the avatar system modifies the first portion of the first body mesh that is determined to penetrate the first accessory mesh to generate an updated body mesh. In some cases, the avatar system modifies the first portion by deleting the portion of the body mesh. Since this portion was the penetrating portion, deleting this portion can display only the accessory mesh for the penetrating portion.

In some cases, the avatar system reduces the body mesh to be flush with the accessory mesh or reduce the body mesh to fall under the accessory mesh such that the body mesh would not show for the penetrating portions, but instead show the accessory. Using the stored intersection data, the system can identify the boundaries of the penetrating portion and automatically modify the body mesh to avoid penetrations—for example, by deleting or deforming the intersecting body parts. This results in clean avatars where the body mesh and accessory mesh integrate smoothly without visible artifacts.

If a user selects a new body-accessory combination that is not already precomputed, the system generates the required meshes and computes the penetration portions. The avatar system stores this new data in the database before assembling the avatar. Over time, the database expands to cover more body and accessory combinations, avoiding real-time computation.

Figure 8:
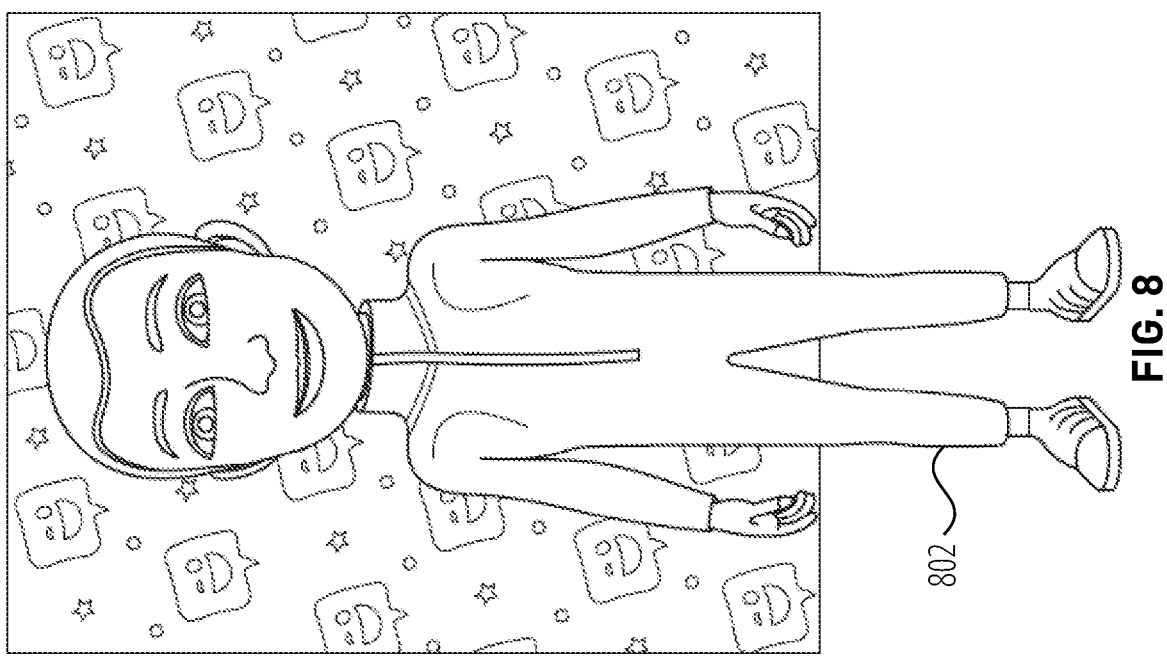
FIG. 8 illustrates the avatar wearing cloths where the body mesh does not penetrate the cloth mesh, according to some examples.

At block 414, the avatar system applies the first accessory mesh to the updated first body mesh to generate the first virtual avatar. FIG. 8 illustrates the avatar 802 wearing cloths where the body mesh does not penetrate the cloth mesh, according to some examples.

The use of a tree structure to generate and modify an avatar allows for efficient customization and adaptation of the avatar's appearance. The avatar's appearance is represented as a hierarchical tree structure. Each node or sub-structure in the tree structure corresponds to a specific part of the avatar, such as the head, body, clothing, accessories, hair, facial features, and more. The root node represents the entire avatar.

Each node in the tree can have sub-nodes representing finer details. For example, the "Head" node may have sub-nodes for "Eyes," "Nose," "Mouth," "Hair," "Glasses," and so on. These sub-nodes can further branch into specific attributes or features.

The interaction system stores pre-generated body meshes that correspond to different body characteristics or types. These body meshes are associated with specific nodes or sub-nodes in the tree structure, allowing for easy selection. Similarly, accessory meshes, such as clothing items or accessories like hats and glasses, are also associated with nodes or sub-nodes in the tree structure. Each node in the tree contains data on the geometry, texture, rigging, etc. for that component.

When the user customizes the avatar by selecting specific characteristics, the system combines the relevant tree structures. For example, if the user selects a certain body type, hairstyle, and clothing, the corresponding nodes in the tree structure are combined.

The hierarchy of the tree structure ensures that the selected attributes are combined in a structured manner. For instance, the "Body" node may be at the root level, while the "Hair" and "Clothing" nodes are sub-nodes under "Head" and "Body," respectively.

In some cases, instead of sending the entire geometry of the avatar model to the client, the system sends the tree structure representation along with associated texture and material information. This reduces data transfer requirements and allows for faster customization.

On the client side, the geometry of the avatar is generated on-the-fly based on the received tree structure. This includes mesh deformation, texture mapping, and material shading. This dynamic generation allows for real-time updates and modifications without the need to send complex 3D models. Sending the compact tree structure and generating geometry on the client side is bandwidth-efficient, especially in modern high-speed internet environments.

In other cases, the server side receives the desired tree structure (either in pieces or the complete tree structure). The server side then generates the entire avatar model by combining meshes associated with such tree structures.

To modify the avatar, the user can select a portion to update, and the interaction system can swap out specific tree structures or sub-structures. For example, if the user wants to change the hairstyle, the "Hair" sub-structure can be replaced with a different one. This change is relatively quick because only a portion of the tree needs to be updated. Dynamic geometry generation is computationally efficient because it only involves updating the affected portions of the avatar, rather than recomputing the entire model.

The avatar's animation, such as movement and expressions, can also be tied to the tree structure. When modifications are made, the animation automatically adjusts to reflect the changes.

In addition, the interaction client can receive and process the tree structure to generate the geometry of the avatar. Because one or more of the processes of the interaction system can perform on the interaction client, remote from the servers, such processing on the client side can result in faster processing given the increase in bandwidth availability in modern technology. Furthermore, client-side processing can improve on data privacy and network communication security, as sensitive data, such as data on the user, may not have to be passed to the server side over the Internet.

In some cases, one or more nodes of the tree structure includes a range of motion for the corresponding body feature. For example, the mouth can have a start position and preconfigured ranges of motions for opening of the mouth.

At block 416, the avatar system displays the first virtual avatar. Before applying textures, the interaction system unwraps 3D meshes by flattening the 3D surface into 2D space, creating a map that corresponds to the mesh's vertices.

The map assigns each vertex on the mesh a set of coordinates that correspond to the texture. This allows the system to know which parts of the texture map should be applied to specific parts of the 3D mesh. Once the 3D mesh is customized, textures are applied to the mesh. Texture mapping involves wrapping 2D images, known as textures, around the 3D mesh to give it color, details, and realism.

The interaction system applies a skin texture, a hair texture, a clothing and accessory texture, and/or the like to the avatar's mesh. The skin texture defines the skin color, tone, and any visible details such as freckles, moles, or wrinkles. The user's selected hairstyle determines the specific hair texture used. Clothing textures can include colors, patterns, and details to make the clothing look realistic. Makeup textures are applied to the avatar's facial mesh, adding details like lipstick, eyeshadow, and blush. Facial details, such as scars or tattoos, are also applied through textures.

The interaction system renders the avatar to be displayed on the user's screen. The interaction system calculates the avatar's appearance in real-time, considering lighting, camera perspective, and the user's interactions.

The interaction system combines the 3D mesh, textures, material properties, shaders, and lighting effects in the rendering engine. The avatar is then displayed on the user's screen, responding to their actions and the virtual environment.

In some cases, the virtual avatar is a three-dimensional animated virtual avatar. The virtual avatar is a three-dimensional animated virtual avatar performing a motion. In some cases, the virtual avatar is displayed in a media content item.

The media content items include:

Content augmentations to enhance images, videos, or other media content items to share with others, such as by adjusting the color or appearance or adding interactive elements such as animations and facial transformations, in real-time.

Emojis that are small images or icons that represent emotions, reactions, or objects.

Stickers are larger images or animations that can be sent in a chat window.

Images or photographs can be sent to other users to share visual information or document a particular event.

Video clips can be used to share recorded content or document a particular event.

Audio messages can be shared to communicate audible communication.

Graphics Interchange Formats (GIFs) are short animations that can be used to add humor or express emotions.

Although examples described herein include a body and accessory characteristic, and corresponding body and accessory meshes, it is appreciated that the interaction system can receive other types of characteristics and meshes, such as 2 body characteristics, 2 accessory characteristics, 10 different body meshes corresponding to different parts of the body, multiple accessory meshes combined into one characteristic, multiple characteristics resulting in a single mesh, and/or the like.

In some cases, the user selects a final button to render the avatar and update portions of the platform that display the avatar. For example, the interaction system can update a profile picture, avatars used in chat and messaging interfaces, avatars that have accompanied comments and reactions to posts, virtual worlds where avatars serve as users' digital personas, gaming, and gamification where avatars represent players, and/or the like.

In some cases, upon a user selection of a user interface element that saves and finalizes the avatar, the avatar system builds the final avatar by generating and combining the meshes and applying textures. In some cases, such final avatar generation is completed by a computing system external to the interaction client of user, such as the avatar server.

Modification of Avatar

Figure 9:
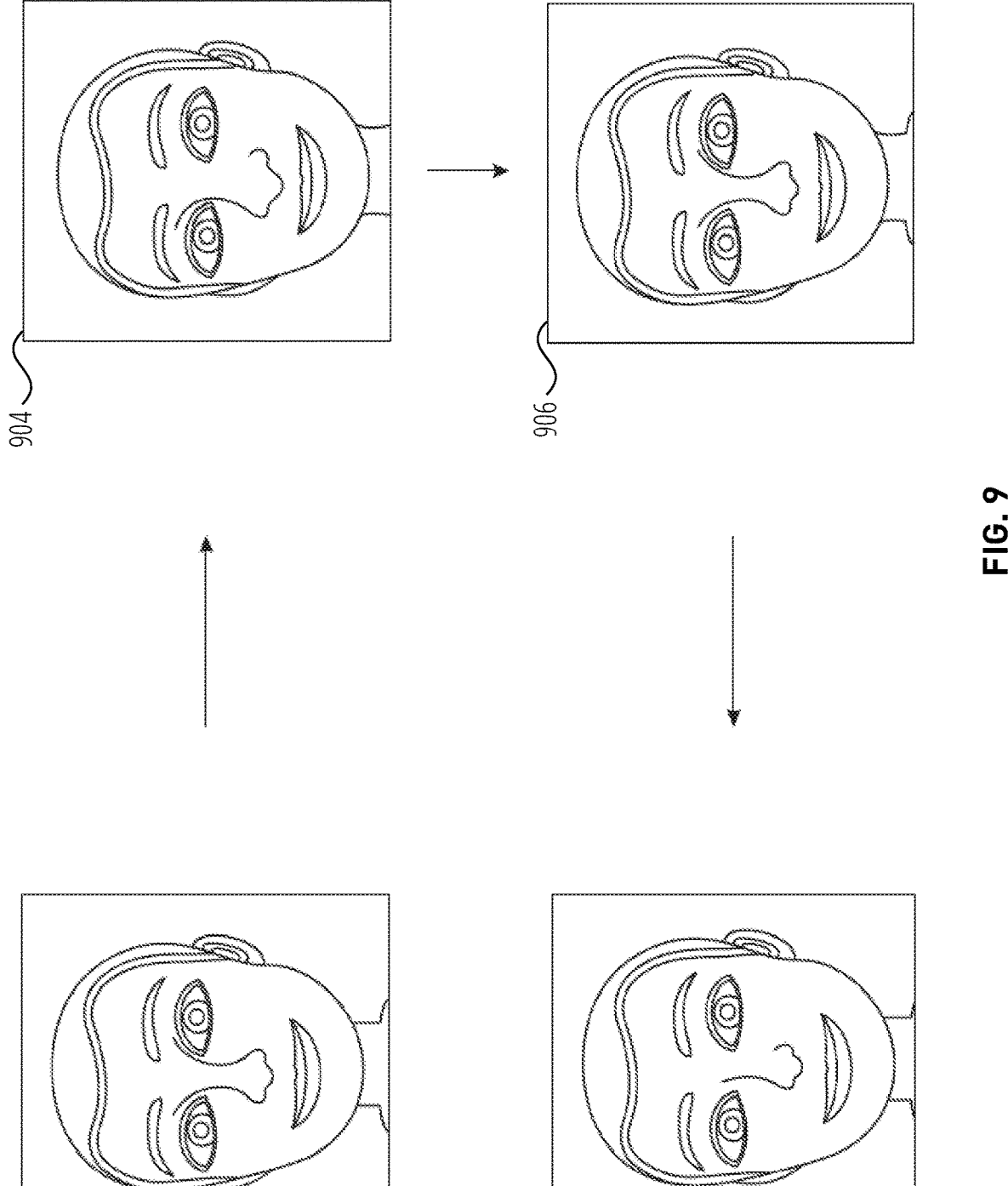
FIG. 9 illustrates modification of an avatar by reverting to a default state, according to some examples.

FIG. 9 illustrates modification of an avatar by reverting to a default state, according to some examples. The interaction system generates an avatar 902 with a medium sized nose. The user requests a larger nose, and the interaction system generates the avatar 904 with a larger nose. Subsequently, the user requests a smaller nose. Instead of deforming the larger nose to a smaller nose, the interaction system reverts the nose back to the avatar 902 to generate avatar 906 and then deforms the nose of avatar 908 to be smaller.

The interaction system displays the final version of the modification and does not display the intermediary step of reverting to the default nose.

The interaction system deforms the nose by retrieving deltas between noses. For example, if avatar 902 has nose 1, avatar 904 has nose 5, and avatar 908 has nose 10, when the user requests for a smaller nose, the interaction system retrieves the difference between nose 5 and nose 1 to revert back to nose 1, then retrieves the difference between nose 1 and nose 10 to create a smaller nose for the avatar.

The interaction system identifies the deltas using vertex or joint positions of blendshapes. For example, each characteristic or feature is mapped to a customization blendshape of vertex position deltas. Such deltas are relative to a base head vertex position. When the user selects one of the characteristics or features, the interaction system retrieves the necessary asset catalog entries that provide resource names for the blendshape vertex position deltas. The interaction system retrieves blendshape vertex position deltas of current and new options. The interaction system then undos vertex position deltas of the current option, which changes the avatar to the "default" vertex positions for the category. The interaction system then applies vertex position deltas of the new option.

The interaction system stores the difference in avatar features to a reference nose, such as nose 1. In an example where the interaction system has 10 different noses, the interaction system would only need to store 9 deltas, the difference between nose 1 and 2, nose 1 and 3, nose 1 and 4, etc. To change from one nose to another, the interaction system reverts back to the reference nose by retrieving the difference from the current nose to the reference nose, then deforms the nose to the desired nose by retrieving the difference between the desired nose and the reference nose.

This approach reduces the amount of data needed to be stored. In contrast, for the interaction system to deform directly from nose 5 to 10, the interaction system would have to store the difference between nose 5 and nose 10. For direct deformation if there were 4 different noses, the interaction system would have to store the difference between nose 1 and 2, nose 1 and 3, nose 1 and 4, nose 2 and 3, nose 2 and 4, and nose 3 and 4 (6 different combinations). Instead, the interaction system described herein stores the difference between nose 1 and 2, nose 1 and 3, and nose 1 and 4 (3 different combinations). As the library of different avatar characteristics grows, having too many combinations begins to overload the device and memory. Instead, when mapping to a reference characteristic, the interaction system can significantly reduce the amount of required memory space.

Retrieving Cached Data of Avatars, Accessories, and Penetration Portions

Figure 10:
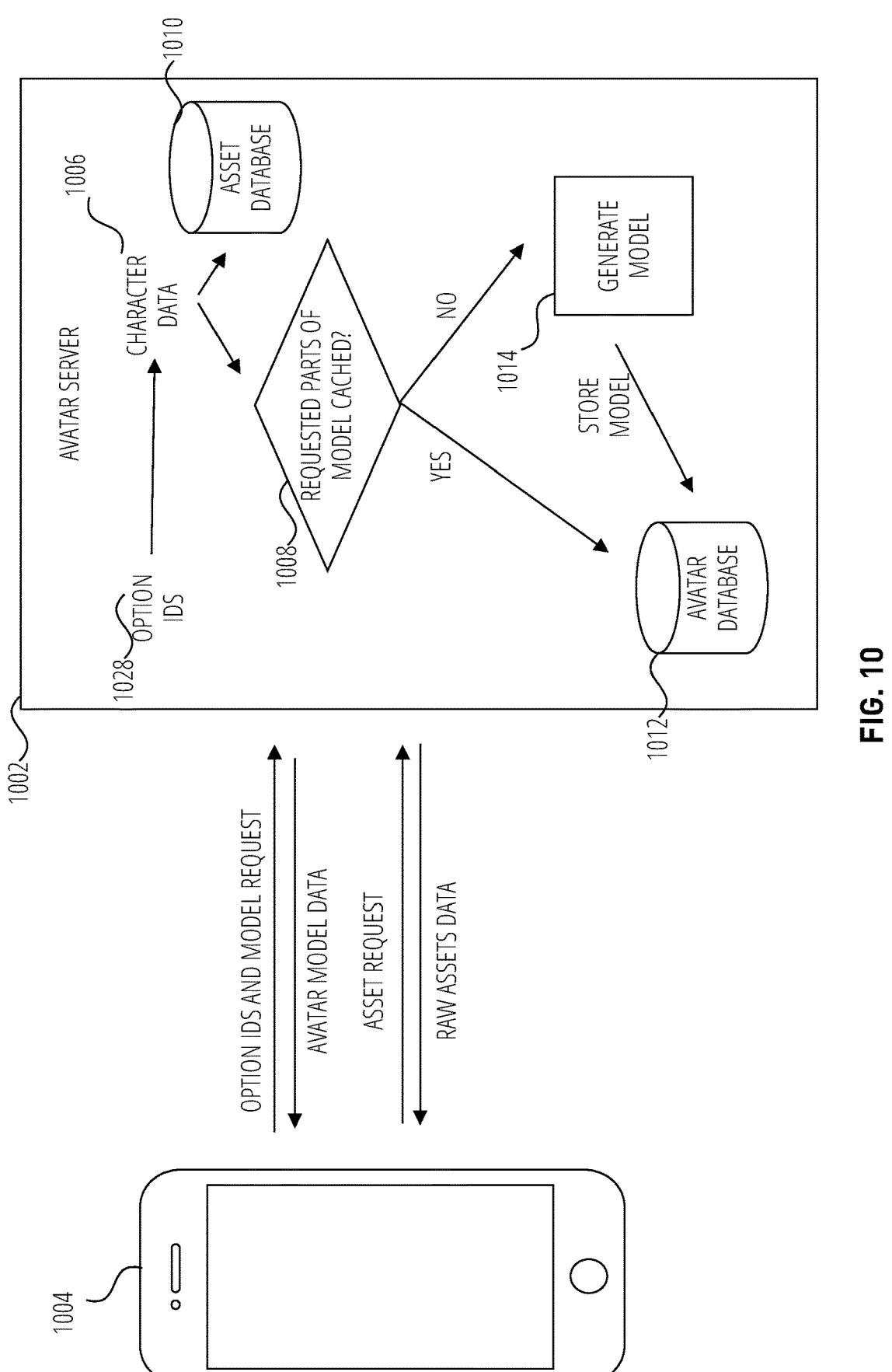
FIG. 10 illustrates an architecture diagram for retrieving cached data of avatars, accessories, and penetration portions, according to some examples.

FIG. 10 illustrates an architecture diagram for retrieving cached data of avatars, accessories, and penetration portions, according to some examples. The interaction device 1004 receives user selection of desired features for an avatar, such as a height, an alien race, hat, and glasses.

The features and characteristics are translated to option identifiers (IDs). These option IDs correspond to such features and characteristics. The system sends these option identifiers with requests for avatar model data, such as mesh information, to the avatar server 1002.

In some cases, the client generates a body characteristic identifier corresponding to a body characteristic for the avatar and an accessory characteristic identifier corresponding to an accessory characteristic. In some cases, the client generates an avatar characteristic identifier corresponding to the body characteristic and the accessory characteristic.

The avatar server 1002 translates the option identifiers 1028 to character data 1006, such as the type of hat or the height of the user. The avatar server determines whether meshes for the requested characteristics are stored 1008, such as in a cache database. If yes, the mesh is retrieved from the avatar database 1012 and returned back to the interaction client.

If the mesh is not stored in the database (such as if this is the first time a user is requesting the characteristic or the combination of characteristics for the avatar), the avatar server 1002 initiates the generation of the models 1014, and subsequently stores such models into the avatar database 1012 for use in the future, by the same user or other users of the platform.

In some cases, the avatar server checks whether a subset of the characteristics for the avatar is stored. The avatar server determines which meshes can penetrate. For example, the avatar server determines that the head mesh can penetrate a glasses mesh or a hat mesh. The avatar server checks whether the head, glasses or hat mesh is stored. The avatar server then checks whether the head mesh has been associated with the glasses or hat mesh to determine penetrating portions. The avatar server repeats the check for other parts of the body, such as a shirt mesh with a torso mesh.

In some cases, the avatar server identifies certain portions that penetrate from the database, such as a hat with the head, but does not identify a saved record of how the head mesh penetrates the glasses mesh. In such circumstances, the avatar server can apply the glasses and the hat to the original head mesh and identify penetrating portions to remove. In other cases, the avatar server can modify the head mesh to not penetrate the hat mesh based on the identified penetrating portion in the database. Then, the avatar server can apply the glasses mesh to the modified head mesh to further deform the head to not penetrate the glasses. Moreover, the avatar server can identify portions of the glasses mesh that penetrate the hat mesh.

In some cases, the client sends an asset request, and the assets are retrieved from the asset database 1010 based on the translated character data 1006. For example, the asset can include textures to be applied to the mesh. The texture can be applied to the mesh by the avatar server and/or transmitted to the client for the client to apply the texture to the mesh.

Data Communications Architecture

Figure 11:
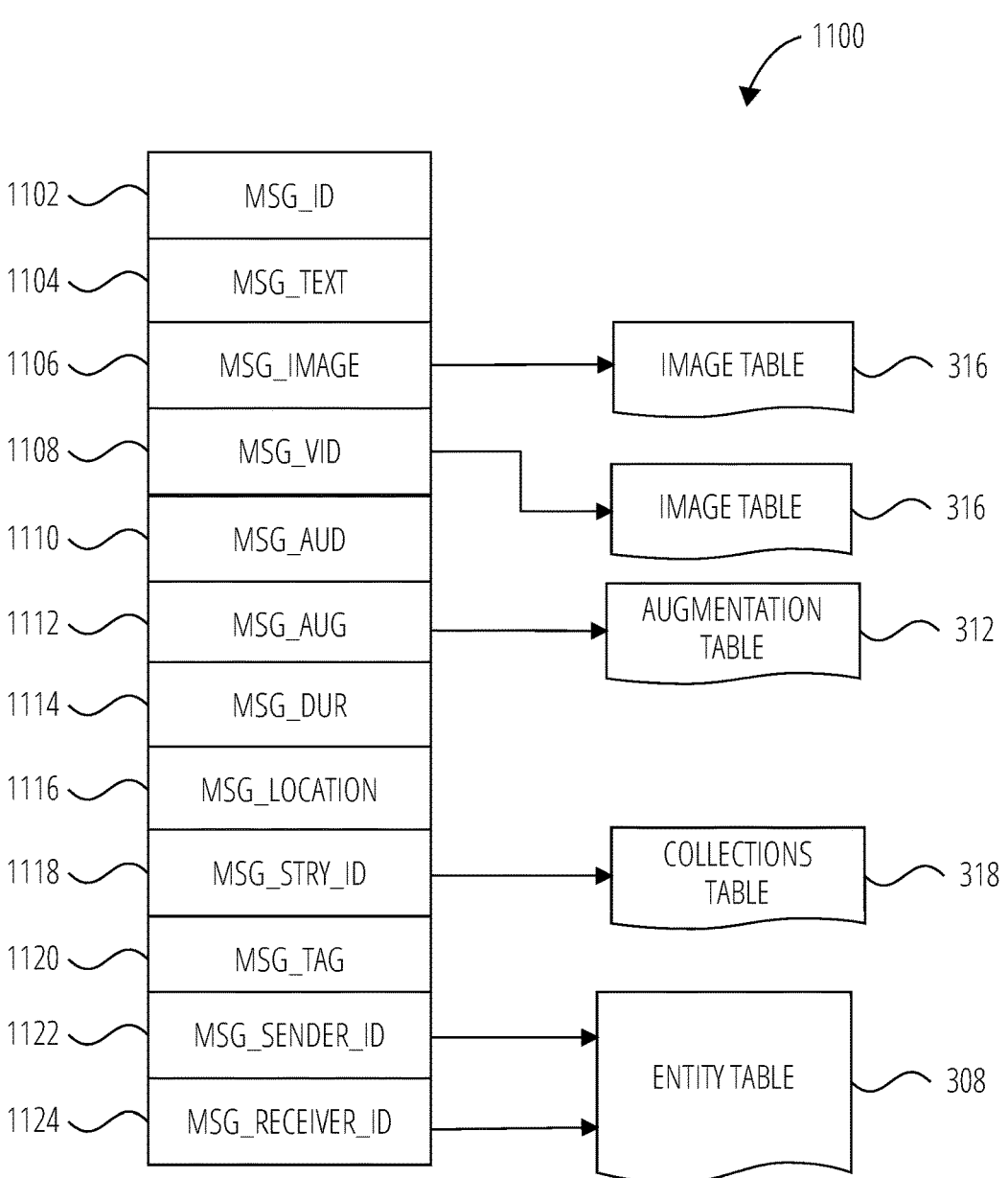
FIG. 11 is a diagrammatic representation of a message, according to some examples.

FIG. 11 is a schematic diagram illustrating a structure of a message 1100, according to some examples, generated by an interaction client 104 for communication to a further interaction client 104 via the interaction servers 124. The content of a particular message 1100 is used to populate the message table 306 stored within the database 304, accessible by the interaction servers 124. Similarly, the content of a message 1100 is stored in memory as "in-transit" or "in-flight" data of the user system 102 or the interaction servers 124. A message 1100 is shown to include the following example components:

Message identifier 1102: a unique identifier that identifies the message 1100.

Message text payload 1104: text, to be generated by a user via a user interface of the user system 102, and that is included in the message 1100.

Message image payload 1106: image data, captured by a camera component of a user system 102 or retrieved from a memory component of a user system 102, and that is included in the message 1100. Image data for a sent or received message 1100 may be stored in the image table 316.

Message video payload 1108: video data, captured by a camera component or retrieved from a memory component of the user system 102, and that is included in the message 1100. Video data for a sent or received message 1100 may be stored in the image table 316.

Message audio payload 1110: audio data, captured by a microphone or retrieved from a memory component of the user system 102, and that is included in the message 1100.

Message augmentation data 1112: augmentation data (e.g., filters, stickers, or other annotations or enhancements) that represents augmentations to be applied to message image payload 1106, message video payload 1108, or message audio payload 1110 of the message 1100. Augmentation data for a sent or received message 1100 may be stored in the augmentation table 312.

Message duration parameter 1114: parameter value indicating, in seconds, the amount of time for which content of the message (e.g., the message image payload 1106, message video payload 1108, message audio payload 1110) is to be presented or made accessible to a user via the interaction client 104.

Message geolocation parameter 1116: geolocation data (e.g., latitudinal and longitudinal coordinates) associated with the content payload of the message. Multiple message geolocation parameter 1116 values may be included in the payload, each of these parameter values being associated with respect to content items included in the content (e.g., a specific image within the message image payload 1106, or a specific video in the message video payload 1108).

Message story identifier 1118: identifier values identifying one or more content collections (e.g., "stories" identified in the collections table 318) with which a particular content item in the message image payload 1106 of the message 1100 is associated. For example, multiple images within the message image payload 1106 may each be associated with multiple content collections using identifier values.

Message tag 1120: each message 1100 may be tagged with multiple tags, each of which is indicative of the subject matter of content included in the message payload. For example, where a particular image included in the message image payload 1106 depicts an animal (e.g., a lion), a tag value may be included within the message tag 1120 that is indicative of the relevant animal. Tag values may be generated manually, based on user input, or may be automatically generated using, for example, image recognition.

Message sender identifier 1122: an identifier (e.g., a messaging system identifier, email address, or device identifier) indicative of a user of the user system 102 on which the message 1100 was generated and from which the message 1100 was sent.

Message receiver identifier 1124: an identifier (e.g., a messaging system identifier, email address, or device identifier) indicative of a user of the user system 102 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 316. Similarly, values within the message video payload 1108 may point to data stored within an image or video table 316, values stored within the message augmentation data 1112 may point to data stored in an augmentation table 312, values stored within the message story identifier 1118 may point to data stored in a collections table 318, and values stored within the message sender identifier 1122 and the message receiver identifier 1124 may point to user records stored within an entity table 308.

System with Head-Wearable Apparatus

Figure 12:
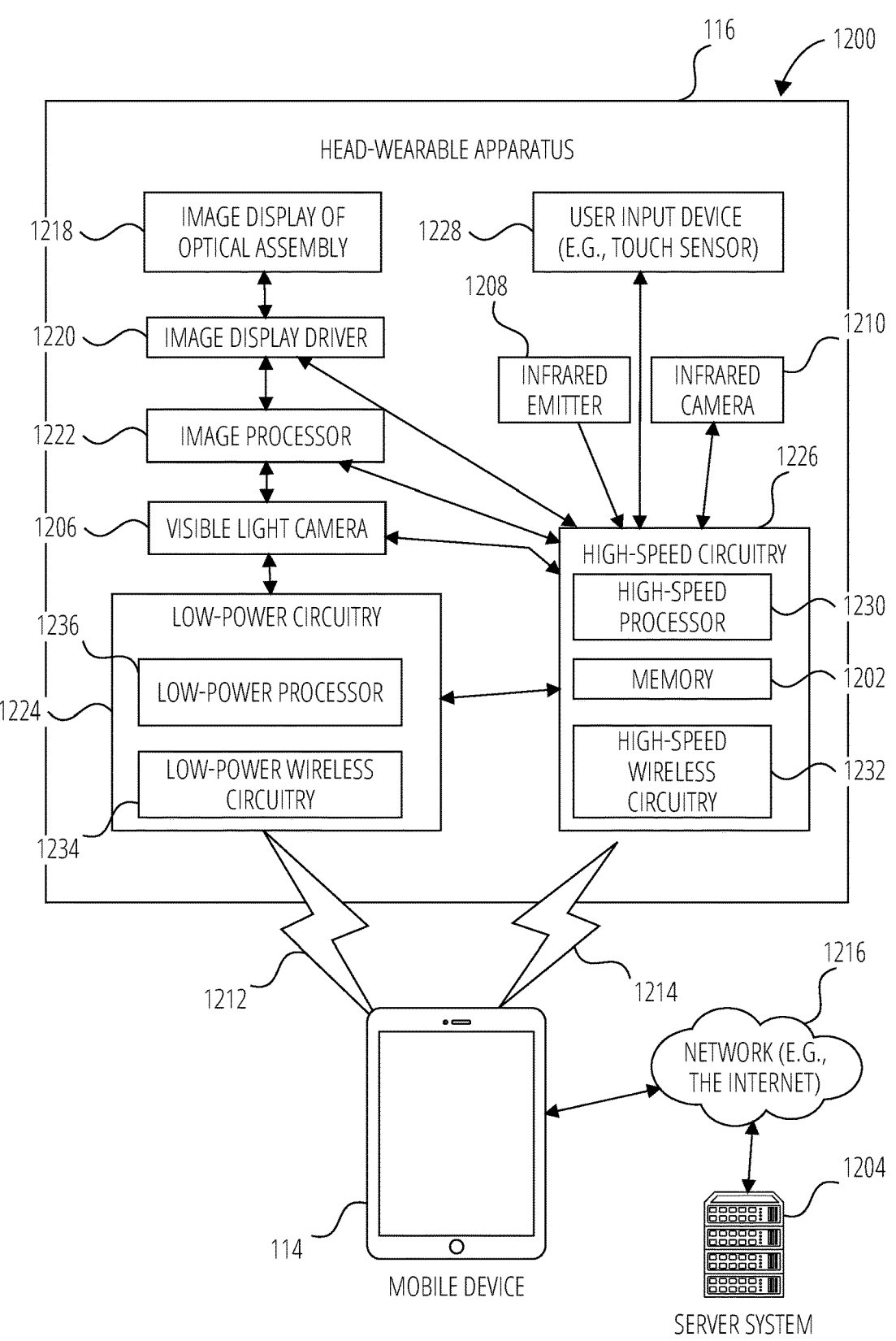
FIG. 12 illustrates a system including a head-wearable apparatus with a selector input device, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108. The networks 108 may include any combination of wired and wireless connections.

The head-wearable apparatus 116 includes one or more cameras, each of which may be, for example, a visible light camera 1206, an infrared emitter 1208, and an infrared camera 1210.

An interaction client, such as a mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WI-FI®. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
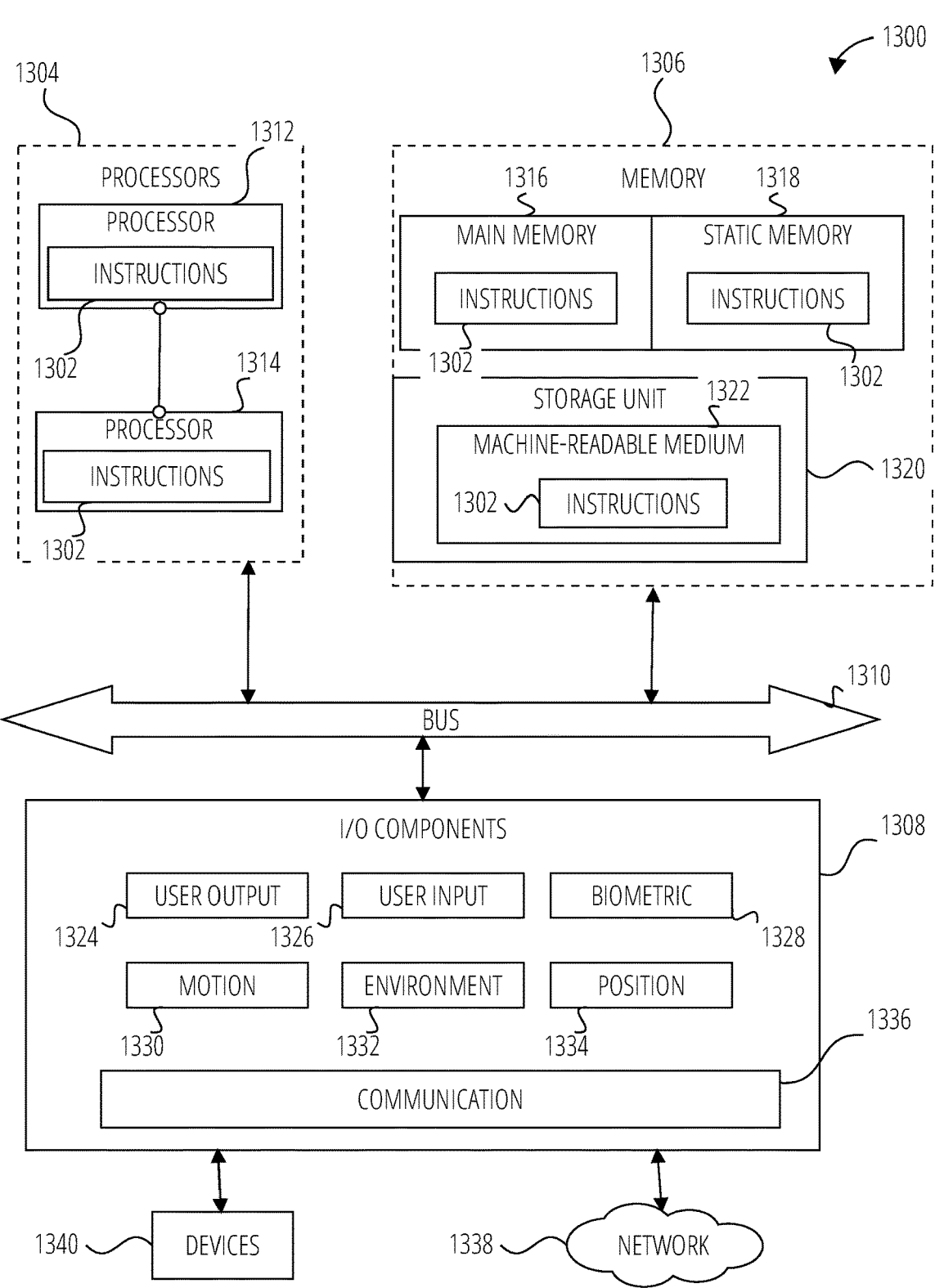
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1330 include acceleration sensor components (e.g., accelerometer), gravitation sensor components, rotation sensor components (e.g., gyroscope).

The environmental components 1332 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture

1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: receiving a first body characteristic for a first virtual avatar; accessing a first body mesh of the first virtual avatar that corresponds to the first body characteristic; receiving a first accessory characteristic for the first virtual avatar; accessing a first accessory mesh that corresponds to the first accessory characteristic; identifying a first portion of the first body mesh that is determined to penetrate the first accessory mesh, the penetration being determined prior to receiving the first body characteristic; modifying the first portion of the first body mesh that is determined to penetrate the first accessory mesh to generate an modified body mesh; applying the first accessory mesh to the modified first body mesh to generate the first virtual avatar; and displaying the first virtual avatar.

In Example 2, the subject matter of Example 1 includes, wherein the first body mesh, the first accessory mesh, and the first portion of the first body mesh that is determined to penetrate the first accessory mesh is retrieved from a database in response to identifying a first database entry of the first body mesh that corresponds to the first body characteristic and a second database entry of the first accessory mesh being associated with the first body mesh.

In Example 3, the subject matter of any one of Examples 1-2 includes, wherein the first portion of the first body mesh is identified without applying the first body mesh to the first accessory mesh subsequent to receiving the first body characteristic.

In Example 4, the subject matter of any one of Examples 1-3 includes, wherein the first virtual avatar is a three-dimensional animated virtual avatar, wherein displaying the first virtual avatar comprises displaying the three-dimensional animated virtual avatar performing a motion.

In Example 5, the subject matter of any one of Examples 1-4 includes, wherein receiving the first body characteristic comprises receiving a user selection of the first body characteristic from a list of body characteristics.

In Example 6, the subject matter of any one of Examples 1-5 includes, wherein receiving the first body characteristic comprises receiving an image or video of a user and identifying the first body characteristic from the image or video of the user.

In Example 7, the subject matter of any one of Examples 1-6 includes, wherein prior to receiving the first body characteristic, the operations further comprise: receiving a second body characteristic; receiving a second accessory characteristic; determining that a second body mesh corresponding to the second body characteristic is not saved in a database; generating the second body mesh corresponding to the second body characteristic; and generating a second accessory mesh corresponding to the second accessory characteristic.

In Example 8, the subject matter of any one of Example 7 includes, wherein the operations further comprise: applying the second accessory mesh to the second body mesh; identifying a second portion of the second body mesh that is penetrating the second accessory mesh; and store the second body mesh as the first body mesh, the second accessory mesh as the first accessory mesh, and the second portion as the first portion in the database.

In Example 9, the subject matter of any one of Examples 1-8 includes, wherein the operations further comprise: receiving a second accessory characteristic for the first virtual avatar; identifying a second portion of the first body mesh that is determined to penetrate a second accessory mesh corresponding to the second accessory characteristic; and modifying the second portion of the first body mesh from the modified first body mesh.

In Example 10, the subject matter of any one of Examples 1-9 includes, wherein the operations further comprise identifying a tree structure corresponding to the first body characteristic, wherein accessing the first body mesh is based on the identified tree structure, wherein each node of the tree structure includes a range of motion for the corresponding body feature.

In Example 11, the subject matter of any one of Examples 1-10 includes, wherein modifying the first portion comprises deleting the first portion from the first body mesh.

In Example 12, the subject matter of any one of Examples 1-11 includes, wherein modifying the first portion comprises deforming the first portion to be flush with the first accessory mesh such as to not penetrate the first accessory mesh.

In Example 13, the subject matter of any one of Examples 1-12 includes, wherein the operations further comprise identifying a body characteristic identifier corresponding to the first body characteristic, wherein accessing the first body mesh is based on the identified body characteristic identifier.

In Example 14, the subject matter of any one of Examples 1-13 includes, wherein the operations further comprise identifying an avatar characteristic identifier corresponding to the first body characteristic and the first accessory characteristic, wherein identifying the first portion of the first body mesh that is determined to penetrate the first accessory mesh is based on the avatar characteristic identifier.

In Example 15, the subject matter of any one of Examples 1-14 includes, wherein the operations further comprise, subsequent to displaying the first virtual avatar, receiving a second accessory characteristic; accessing a second accessory mesh that corresponds to the second accessory characteristic; identifying a second portion of the first body mesh that is determined to penetrate the second accessory mesh; and modifying the second portion of the first body mesh that is determined to penetrate the second accessory mesh.

In Example 16, the subject matter of Example 15 includes, wherein the operations further comprise reapplying the first portion prior to modifying the second portion of the first body mesh.

In Example 17, the subject matter of any one of Examples 15-16 includes, wherein the operations further comprise determining whether the first portion of the first body mesh penetrates the second accessory mesh, and in response to determining that the first portion does not penetrate the second accessory mesh, adding the first portion back to the first body mesh.

In Example 18, the subject matter of any one of Examples 1-17 includes, wherein the operations further comprise, subsequent to displaying the first virtual avatar, receiving a second accessory characteristic; accessing a second accessory mesh that corresponds to the second accessory characteristic; identifying a second portion of the first body mesh that is determined to penetrate the second accessory mesh; modifying the second portion of the first body mesh that includes the first portion; and applying the second accessory mesh to the first body mesh with the modified second portion.

Example 19 is a method comprising: receiving a first body characteristic for a first virtual avatar; accessing a first body mesh of the first virtual avatar that corresponds to the first body characteristic; receiving a first accessory characteristic for the first virtual avatar; accessing a first accessory mesh that corresponds to the first accessory characteristic; identifying a first portion of the first body mesh that is determined to penetrate the first accessory mesh, the penetration being determined prior to receiving the first body characteristic; modifying the first portion of the first body mesh that is determined to penetrate the first accessory mesh to generate an modified body mesh; applying the first accessory mesh to the modified first body mesh to generate the first virtual avatar; and displaying the first virtual avatar.

Example 20 is a non-transitory computer-readable storage medium storing instructions that, when executed by at least one processor, cause the at least one processor to perform operations comprising: receiving a first body characteristic for a first virtual avatar; accessing a first body mesh of the first virtual avatar that corresponds to the first body characteristic; receiving a first accessory characteristic for the first virtual avatar; accessing a first accessory mesh that corresponds to the first accessory characteristic; identifying a first portion of the first body mesh that is determined to penetrate the first accessory mesh, the penetration being determined prior to receiving the first body characteristic; modifying the first portion of the first body mesh that is determined to penetrate the first accessory mesh to generate an modified body mesh; applying the first accessory mesh to the modified first body mesh to generate the first virtual avatar; and displaying the first virtual avatar.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metro-politan area network (MAN), the Internet, a portion of the Internet, a portion of the Public Switched Telephone Net-work (PSTN), a plain old telephone service (POTS) net-work, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cel-lular or wireless coupling. In this example, the coupling may implement any of a variety of types of data transfer tech-nology, such as Single Carrier Radio Transmission Technol-ogy (1×RTT), Evolution-Data Optimized (EVDO) technol-ogy, General Packet Radio Service (GPRS) technology, Enhanced Data rates for GSM Evolution (EDGE) technol-ogy, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organi-zations, other long-range protocols, or other data transfer technology.

"Component" refers, for example, to a device, physical entity, or logic having boundaries defined by function or subroutine calls, branch points, APIs, or other technologies that provide for the partitioning or modularization of par-ticular processing or control functions. Components may be combined via their interfaces with other components to carry out a machine process. A component may be a packaged functional hardware unit designed for use with other com-ponents and a part of a program that usually performs a particular function of related functions. Components may constitute either software components (e.g., code embodied on a machine-readable medium) or hardware components. A "hardware component" is a tangible unit capable of per-forming certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware compo-nent may also be implemented mechanically, electronically, or any suitable combination thereof. For example, a hard-ware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or cir-cuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedi-cated and permanently configured circuitry, or in temporar-ily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Consid-ering examples in which hardware components are tempo-rarily configured (e.g., programmed), each of the hardware components need not be configured or instantiated at any one instance in time. For example, where a hardware com-ponent comprises a general-purpose processor configured by software to become a special-purpose processor, the general-purpose processor may be configured as respectively differ-ent special-purpose processors (e.g., comprising different hardware components) at different times. Software accord-ingly configures a particular processor or processors, for example, to constitute a particular hardware component at one instance of time and to constitute a different hardware component at a different instance of time. Hardware com-ponents can provide information to, and receive information from, other hardware components. Accordingly, the described hardware components may be regarded as being communicatively coupled. Where multiple hardware com-ponents exist contemporaneously, communications may be achieved through signal transmission (e.g., over appropriate circuits and buses) between or among two or more of the hardware components. In examples in which multiple hard-ware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are tempo-rarily configured (e.g., by software) or permanently config-ured to perform the relevant operations. Whether temporar-ily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
at least one processor; and
at least one memory component storing instructions that, when executed by the at least one processor, cause the at least one processor to perform operations comprising:
receiving a first body characteristic for a first virtual avatar;
accessing a first body mesh of the first virtual avatar that corresponds to the first body characteristic;
receiving a first accessory characteristic for the first virtual avatar;
accessing a first accessory mesh that corresponds to the first accessory characteristic;
identifying a first portion of the first body mesh that is determined to penetrate the first accessory mesh, the penetration being determined prior to receiving the first body characteristic;
modifying the first portion of the first body mesh that is determined to penetrate the first accessory mesh to generate a modified body mesh, wherein modifying the first portion comprises deleting the first portion from the first body mesh;
applying the first accessory mesh to the modified first body mesh to generate the first virtual avatar; and
displaying the first virtual avatar.

2. The system of claim 1, wherein the first body mesh, the first accessory mesh, and the first portion of the first body mesh that is determined to penetrate the first accessory mesh is retrieved from a database in response to identifying a first database entry of the first body mesh that corresponds to the first body characteristic and a second database entry of the first accessory mesh being associated with the first body mesh.

3. The system of claim 1, wherein the first portion of the first body mesh is identified without applying the first body mesh to the first accessory mesh subsequent to receiving the first body characteristic.

4. The system of claim 1, wherein the first virtual avatar is a three-dimensional animated virtual avatar, wherein displaying the first virtual avatar comprises displaying the three-dimensional animated virtual avatar performing a motion.

5. The system of claim 1, wherein receiving the first body characteristic comprises receiving a user selection of the first body characteristic from a list of body characteristics.

6. The system of claim 1, wherein receiving the first body characteristic comprises receiving an image or video of a user and identifying the first body characteristic from the image or video of the user.

7. The system of claim 1, wherein prior to receiving the first body characteristic, the operations further comprise:
  receiving a second body characteristic;
  receiving a second accessory characteristic;
  determining that a second body mesh corresponding to the second body characteristic is not saved in a database;
  generating the second body mesh corresponding to the second body characteristic; and
  generating a second accessory mesh corresponding to the second accessory characteristic.

8. The system of claim 7, wherein the operations further comprise:
  applying the second accessory mesh to the second body mesh;
  identifying a second portion of the second body mesh that is penetrating the second accessory mesh; and
  store the second body mesh as the first body mesh, the second accessory mesh as the first accessory mesh, and the second portion as the first portion in the database.

9. The system of claim 1, wherein the operations further comprise:
  receiving a second accessory characteristic for the first virtual avatar;
  identifying a second portion of the first body mesh that is determined to penetrate a second accessory mesh corresponding to the second accessory characteristic; and
  modifying the second portion of the first body mesh from the modified first body mesh.

10. The system of claim 1, wherein the operations further comprise identifying a tree structure corresponding to the first body characteristic, wherein accessing the first body mesh is based on the identified tree structure, wherein each node of the tree structure includes a range of motion for a corresponding body feature.

11. The system of claim 1, wherein modifying the first portion further comprises deforming the first portion to be flush with the first accessory mesh such as to not penetrate the first accessory mesh.

12. The system of claim 1, wherein the operations further comprise identifying a body characteristic identifier corresponding to the first body characteristic, wherein accessing the first body mesh is based on the identified body characteristic identifier.

13. The system of claim 1, wherein the operations further comprise identifying an avatar characteristic identifier corresponding to the first body characteristic and the first accessory characteristic, wherein identifying the first portion of the first body mesh that is determined to penetrate the first accessory mesh is based on the avatar characteristic identifier.

14. The system of claim 1, wherein the operations further comprise, subsequent to displaying the first virtual avatar, receiving a second accessory characteristic; accessing a second accessory mesh that corresponds to the second accessory characteristic; identifying a second portion of the first body mesh that is determined to penetrate the second accessory mesh; and modifying the second portion of the first body mesh that is determined to penetrate the second accessory mesh.

15. The system of claim 14, wherein the operations further comprise reapplying the first portion prior to modifying the second portion of the first body mesh.

16. The system of claim 14, wherein the operations further comprise determining whether the first portion of the first body mesh penetrates the second accessory mesh, and in response to determining that the first portion does not penetrate the second accessory mesh, adding the first portion back to the first body mesh.

17. The system of claim 1, wherein the operations further comprise, subsequent to displaying the first virtual avatar, receiving a second accessory characteristic; accessing a second accessory mesh that corresponds to the second accessory characteristic; identifying a second portion of the first body mesh that is determined to penetrate the second accessory mesh; modifying the second portion of the first body mesh that includes the first portion; and applying the second accessory mesh to the first body mesh with the modified second portion.

18. A method comprising:
  receiving a first body characteristic for a first virtual avatar;
  accessing a first body mesh of the first virtual avatar that corresponds to the first body characteristic;
  receiving a first accessory characteristic for the first virtual avatar;
  accessing a first accessory mesh that corresponds to the first accessory characteristic;
  identifying a first portion of the first body mesh that is determined to penetrate the first accessory mesh, the penetration being determined prior to receiving the first body characteristic;
  modifying the first portion of the first body mesh that is determined to penetrate the first accessory mesh to generate an modified body mesh, wherein modifying the first portion comprises deforming the first portion to be flush with the first accessory mesh;
  applying the first accessory mesh to the modified first body mesh to generate the first virtual avatar; and
  displaying the first virtual avatar.

19. A non-transitory computer-readable storage medium storing instructions that, when executed by at least one processor, cause the at least one processor to perform operations comprising:
  receiving a first body characteristic for a first virtual avatar;
  accessing a first body mesh of the first virtual avatar that corresponds to the first body characteristic;
  receiving a first accessory characteristic for the first virtual avatar;
  accessing a first accessory mesh that corresponds to the first accessory characteristic;
  identifying a first portion of the first body mesh that is determined to penetrate the first accessory mesh, the penetration being determined prior to receiving the first body characteristic;

modifying the first portion of the first body mesh that is determined to penetrate the first accessory mesh to generate an modified body mesh;

reapplying the first portion prior to modifying a second portion of the first body mesh; 5 modifying the second portion of the first body mesh that is determined to penetrate a second accessory mesh;

applying the first accessory mesh to the modified first body mesh to generate the first virtual avatar;

displaying the first virtual avatar. 10

\* \* \* \* \*